United States Patent [19]
Takazawa

[11] Patent Number: 5,516,975
[45] Date of Patent: May 14, 1996

[54] METHODS FOR PROCESSING LEACHATE USING COMPLETELY CLOSED SYSTEM IN MONITOR-TYPE AND STABILIZING-TYPE INDUSTRIAL AND NON-INDUSTRIAL WASTE TREATMENT PLANT

[75] Inventor: Hidenao Takazawa, Kuki, Japan

[73] Assignee: Senka Co., Saitama, Japan

[21] Appl. No.: 253,149

[22] Filed: Jun. 2, 1994

Related U.S. Application Data

[62] Division of Ser. No. 964,710, Oct. 22, 1992.

[30] Foreign Application Priority Data

Apr. 2, 1992 [JP] Japan ................... 4-081178

[51] Int. Cl.$^6$ ................................. A62D 3/00
[52] U.S. Cl. ................ 588/256; 95/228; 55/267
[58] Field of Search ................ 588/256; 95/228, 95/225; 55/267

[56] References Cited

U.S. PATENT DOCUMENTS

| | | | |
|---|---|---|---|
| 3,477,203 | 11/1969 | Luge et al. | 95/228 X |
| 3,864,840 | 2/1975 | Baskin | 34/5 |
| 3,985,086 | 10/1976 | De Tola | 110/8 P |
| 4,507,127 | 3/1985 | Hirose | 48/49 |
| 4,583,470 | 4/1986 | Hirose | 110/346 |
| 4,585,463 | 4/1986 | Hirose | 48/111 |
| 4,964,885 | 10/1990 | Wieser-Linhart | 95/225 X |
| 5,050,508 | 9/1991 | Wilson | 55/267 X |

FOREIGN PATENT DOCUMENTS

| | | |
|---|---|---|
| 031558 | 12/1979 | European Pat. Off. . |
| 2518525 | 12/1982 | France . |
| 61-29025 | 10/1981 | Japan ................... 45/228 |
| 196279 | 1/1987 | Japan . |
| 22907 | 3/1987 | Japan . |
| 326973 | 2/1992 | Japan . |
| 129120 | 4/1992 | Japan . |
| 81178 | 11/1992 | Japan . |
| 8603143-2 | 9/1989 | Sweden . |

Primary Examiner—Ramon S. Britts
Assistant Examiner—Frederick L. Lagman
Attorney, Agent, or Firm—Limbach & Limbach; W. Patrick Bengtsson

[57] ABSTRACT

The present invention provides a method for processing wastes containing a large amount of water and a method for processing leachate from industrial wastes. Specifically, the present invention provides a method which comprises maintaining reduced pressure in the dryer equipped with a stirring means, feeding wastes containing a large amount of water to the dryer, stirring the wastes while blowing refrigerated air at −20° C.±5° C. to the dryer, and drying the frozen moisture portion of the wastes by sublimation. Air heated at 80° C.+10° C. can be used instead of refrigerated air to dry water of the wastes by evaporation. The present invention also provides a method for processing leachate which comprises pooling leachate industrial wastes and burned ashes, and utilizing the leachate to absorb wet-type toxic gas, thereby confining the leachate within the waste treatment plant. The present invention therefore make it possible to process wastes containing a large amount of water, which have been a problem in the incineration by the conventional methods, by using the potentioal heat of the waste gas from the incinerater. The present invention also provides an effective means to prevent environmental contamination because leachate is confined in the waste treatment plant.

6 Claims, 6 Drawing Sheets

PROCESS FOR TREATING WASTES BY THE CLOSED SYSTEM

PROCESS FOR TREATING WASTES BY THE CLOSED SYSTEM

METHODS FOR PROCESSING LEACHATE USING COMPLETELY CLOSED SYSTEM IN MONITOR-TYPE AND STABILIZING-TYPE INDUSTRIAL AND NON-INDUSTRIAL WASTE TREATMENT PLANT

This is a divisional of application Ser. No. 07/964,710, filed Oct. 22, 1992.

BACKGROUND OF THE INVENTION

Wastes from the daily lives of households and commercial establishments involved in eating and drinking such as restaurants and shops contain a large amount of water. The present invention relates to methods for processing wastes containing a large amount of water prior to incineration in order to burn the wastes efficiently, specifically to the processes such as drying, disintegrating, and sorting the wastes, prior to incineration.

The present invention also relates to methods that prevent toxic metals, such as heavy metals contained in industrial and non-industrial wastes, from discharging into the local environment around the waste processing plant, to protect the environment from the contamination.

Industrial wastes and non-industrial wastes end up with reclamation sites along the seashore, landfill sites in an inland area, and incinerators. However, wastes are not dumped for reclamation sites along the seashore forever, because reclamation from the sea is environmentally problematic and the more the wastes are dumped, the smaller the dumping sites.

The incinerator is costly because of an initial cost of building the plant and the running cost of the plant including the labor cost. In addition, the site to build the plant is limited because the incinerator produces unpleasant odors, toxic waste gases, airborne particles, and burned ashes. Another problem of the incinerator is the incinerator itself. The incinerator is required to increase its capacity in order to completely burn a large amount of garbage. However, complete combustion of a large amount of garbage is economically unfavorable.

Industrial wastes contain metals. Metals, especially heavy metals, have played an important role in various fields and contributed to technological development. Once metals complete their role, however, most of them are typically disposed in landfill sites as industrial wastes except that the removal of metals from the wastes is economically feasible. When disposed, heavy metals could become harmful to people and potentially cause various disorders. The trace amount of heavy metals contaminates the environment and the contamination draws a special attention in our society.

The present inventors previously filed the invention directed to the method for removing toxic substances from the leachate from burned ashes containing toxic heavy metals, the method that are used to process industrial and non-industrial wastes (Japanese Patent Application No. 96995/1991). The present inventors also filed the invention directed to the method for preventing environmental contamination in the surrounding area of the waste processing plant by processing toxic-components-containing wastewater produced in the waste processing plant and processing the wastewater in the plant without discharging it to the outside environment (Japanese Patent Application No. 81178/1992).

In order to prevent the discharge of environmental contaminants such as heavy metals contained in industrial wastes and their ashes, the first previous invention was directed to the method for preventing the discharge of the environmental contaminants by placing the industrial wastes in a soil layer built under the ground to confine the industrial wastes, the soil layer that is composed of a mixture of volcanic ash soil and alluvial soil. The toxic substance content in the leachate from the structure is lower than the standard established by the Ministry of Welfare and is found to be safe to be discharged in rivers.

SUMMARY OF THE INVENTION

The present invention provides methods for processing wastes containing a large amount of water to dry and sort the wastes prior to incineration using heat generated in the combustion process of waste. The present invention provides methods that obviate the discharge of leachate from industrial wastes to the local environment around the waste treatment plant. Therefore, the present invention contributes to environmental contamination prevention measures and greatly benefits various industries.

BRIEF DESCRIPTION OF THE FIGURE

In FIG. 6, *1 is a harmful component removal equipment disclosed in Japanese Patent Application No. 96995/1991. *2 is a completely closed system for processing leachate in the monitor-type waste treatment plant as is disclosed in Japanese Patent Application No. 81178/1992. *3 is a dryer for drying wastes prior to incineration as is disclosed in Japanese Patent Application No. 129120/1992.

In FIG. 1 represents hopper into which wastes are fed, 2; motor, 3; rotor, 4; bearer, 5; duct serving to reduce pressure, 6; duct serving to blow air, 7; pipe serving to supply cold or heated air, 8; belt conveyor, 9; sorter.

DETAILED DESCRIPTION OF THE INVENTION

Figure 1A:
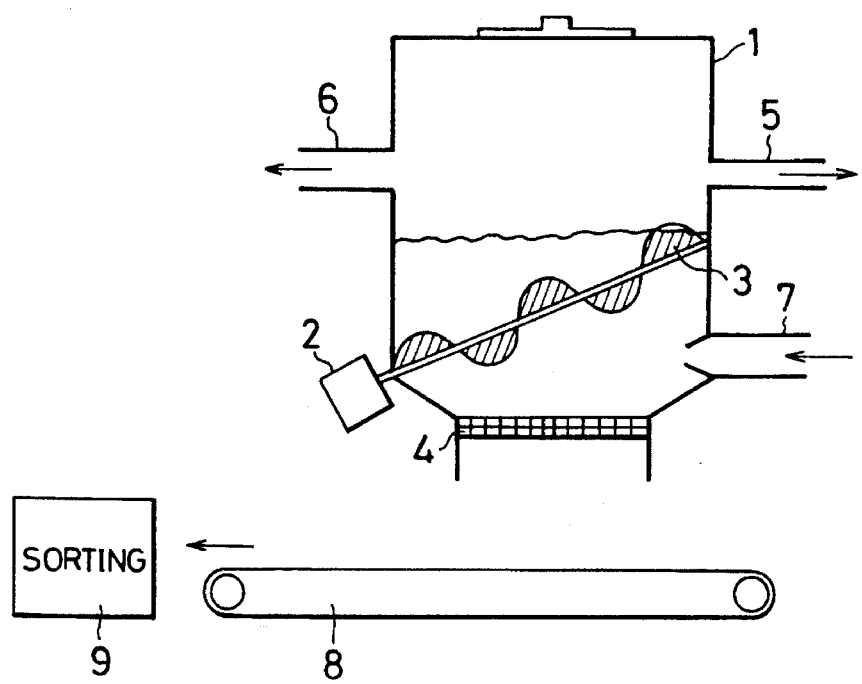
FIG. 1 is a schematic diagram of the dryer of the invention. (A) is a diagram showing drying of wastes and (B) is a diagram showing the removal of the wastes.

The major issues of the previous invention was a method of burning wastes efficiently to increase its economicality. Garbage produced from the households and eating and drinking establishments contain water up to 90% of its volume. The water content of garbage make it hard to be burned by the typical incinerator and is required a great amount of fuel to burn out the garbage. However, it was a very uneconomical way to process wastes.

In the processing of industrial wastes, it is a general practice that wastewater is discharged into the outside of the waste treatment plant after removing toxic components in the leachate.

In order to discharge wastewater from industrial wastes into rivers, one must notify the government offices concerned and always monitor the condition of wastewater treatment. Wastewater quality control is costly, and easier methods of monitoring wastewater have been awaited.

In addition, processes for making contaminated wastewater harmless have been acutely needed because wastewater containing toxic components leaches out when industrial wastes are caught in the rain before incineration, or because wastewater containing toxic metals is produced during industrial waste processing steps or by their equipments.

Preliminary heating equipment for wastes was disclosed where wastes are dryed before incineration by heat of waste gases, the temperature of which is not high enough to bum out wastes (Japanese Patent Application Kokai No. 22907/1987). The preliminary heating equipment, however, can not cope with a large amount of garbage for incineration.

It is an object of the present invention to provide a method for processing wastes containing a large amount of water to incinerate the wastes efficiently so that the problems of the conventional waste treatment plant can be overcome.

It is another object of the present invention to provide a method for processing wastewater generated in the manufacuring process. The method of the invention reduces cumbersome wastewater quality control that is always required in conventional waste processing methods, and allows wastewater, used to be discharged into rivers, to be utilized in the industrial waste treatment plant, thereby obviating the discharge of wastewater into rivers. In addition, the method of the invention helps solve the problems, such as compensatory allowance for fishing right and contamination in the habitat of wild birds, which are arisen from discharging wastewater into rivers.

To attain the object of the invention, the present inventors have studied methods to solve the problem and successfully found the following method:(1) refrigerating or heating wastes under reduced pressure efficiently dry wastes prior to incineration; (2) leachate from industrial wastes can be processed in a complete closed system in the industrial waste treatment plant without discharging the leachate into rivers; the leachate can be utilized for cooling waste gases from an incinerator for industrial wastes; and part of the leachate can be utilized for removing toxic waste gases by humidifying the gases.

The present invention provides a method for processing wastes containing a large amount of water, comprising feeding the wastes in the dryer equipped with a stirring means in which reduced pressure is maintained, stirring the wastes while blowing refrigerated air at $-20°$ C.$\pm 5°$ C. into the dryer, and drying frozen moisture protion of the wastes by sublimation. In the method, heated air at $80°$ C.$\pm 10°$ C. can be used instead of refrigerated air to evaporate the moisture of the wastes.

The present invention also provides a method for processing leachate by utilizing the leachate in the waste treatment plant.

The present invention relates to a method for processing leachate from industrial wastes, comprising pooling in an equalizing tank various leachates containing toxic heavy metals contained in industrial wastes and their burned ashes, sending the leachates from the equalizing tank to a cooling-water receiving tank of the waste gases from the incinerator, and sending a given amount of the leachates from the cooling-water receiving tank to the cooling site of the waste gases. The leachates described above include leachate from a general-purpose, harmful component removal equipment, or leachate from industrial wastes that are not incinerated, or wastewater containing toxic components used in industrial waste processing steps or by their equipments. The present invention also relates to a method of using treated leachate, that is, harmful-component-free water, comprising sending treated leachate from the cooling-water receiving tank to a wet-type toxic gas absorption equipment to wash and remove harmful components from waste gases, and subsequently using part of the resulting wastewater in the wet-type toxic gas absorption equipment to cool the waste gases from the incinerator.

In the present invention, drying of wastes prior to incineration is carried out with refrigerating or heating wastes under reduced pressure. The means of reducing pressure in the dryer includes those typically used out the art and the one where an air volume blowing is larger amount than that blowing in to keep the inside of the dryer under reduced pressure (disclosed in Japanese Patent Application Kokai No. 196279/1987). Preferably, the air volume blown in and out should be adjusted to maintain the pressure of the dryer at 800 mmAq-500 mmAq. When air blowing in to the dryer is refrigerated to $-20°$ C.$\pm 5°$ C. under the reduced pressure described above, moisture in wastes is frozen at the triple point of water (4.6 Torr $0°$ C.) and then sublimed to reduce moisture in the wastes.

The refrigerator to freeze air blowing in to the dryer includes a heat absorbing-type refrigerator that utilizes the potential heat of the waste gas from the incinerator described below. In the waste incinerator (capacity 55 t/day), cold air at $-15°$ C. can be blown by the refrigerator using waste gas at 0.7 $m^3$/sec.

Air is heated to $80°$ C.$\pm 10°$ C. by the waste gas of the incinerator using an widely-used heat exchanger and is blown into the dryer. If temperature of the air is too high, easily ignitable substances may be in danger of being ignited. On the other hand, if temperature of the air is too low, sufficient drying is not achieved. Moisture evaporated from wastes is discharged with exhausts from the dryer and emits unpleasant odors. To eliminate the emission of unpleasant odors in the surrounding area, exhausts from the dryer are designed to be discharged into the combustion chamber of the incinerator to thermally decompose the components of unpleasant odors. When waste is stirred in the dryer, water comes out from the wastes and pools at the bottom of the dryer and is not evaporated. This water is also evaporated in the combustion chamber of the incinerator.

Wastes containing a large amount of water contain a large amount of leachate.

Leachate of the invention is intended to mean water containing toxic components in a solubilized form which is percolated from industrial wastes and the like. Treated leachate is intended to mean leachate purified in such a degree that leachate is allowed to be discharged in rivers. Wastewater is intended to mean water containing toxic components used in the industrial processing steps or by their equipments.

Figure 4:
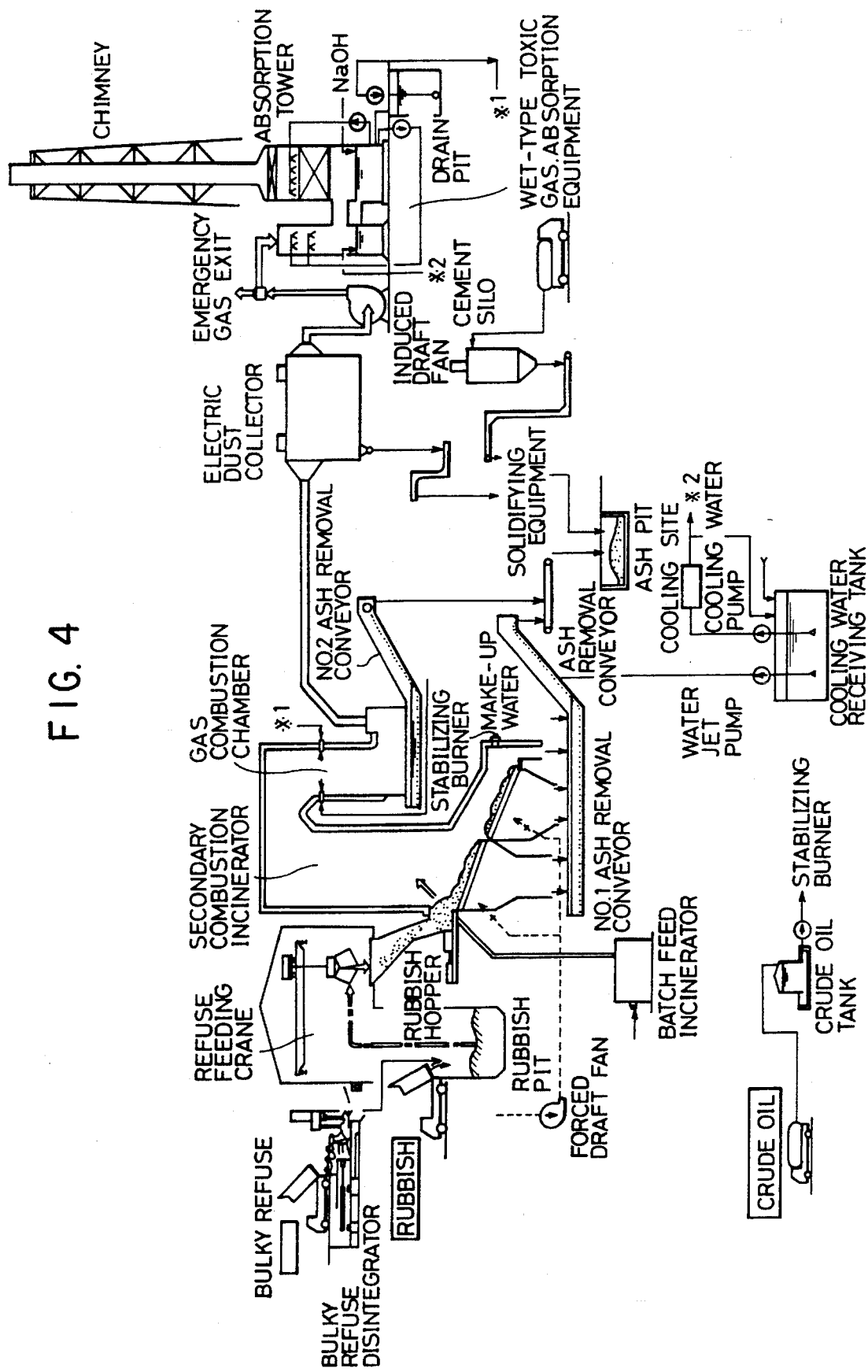
FIG. 4 is a schematic diagram of the waste treatment plant of the invention.

FIG. 4 is a schematic illustration showing the entire processing step for industrial wastes. Among industrial wastes, delivered bulky refuse is shattered in the disintegrator.

Rubbish is stored in the pit and fed with a given amount of the rubbish into the hopper of the incinerator by the refuse crane.

Industrial wastes burned in the incinerator is turned into burned ashes, most of which falls on the No. 1 ash removal conveyer built on the bottom of the incinerator. Airborne particles dispersed with combustion gas become a cullet-like form (glass-like particles) by a high temperature (850° C.) of the gas. The cullet-like form containing toxic components in its inside is fallen by water spray in the cooling chamber for burned waste gas, removed by the No. 2 ash removal conveyor and stored with ashes brought by the No. 1 ash removal conveyor in the ash pit.

As cooling water for the burned waste gas, the present invention utilizes treated leachate from industrial wastes (see Japanese Patent Application No. 96995/1991), leachate from industrial wastes that are not processed, and wastewater containing toxic components which is used in industrial waste processing steps or by their equipments, without specifically processing these waters. The cooling water is sprayed and converted into steam by a high temperature (850° C.) of waste gas while the temperature of the waste gas is decreased. Airborne particles present in the cooling water becomes a cullet-like form, which absorbs or encloses toxic components on its surface or inside, and the toxic-component-bearing cullet is removed by the ash removal conveyor.

The resulting burned ashes are processed according to the method disclosed in Japanese Patent Application No. 96995/1991 or solidified with cement and buried under the ground. Cooled waste gas, after its airborne dust being collected by the electric dust collector, is sent to the wet-type toxic gas absorption equipment by the induced draft fan (IDF). In the wet-type toxic gas absorption equipment, water is sprinkled to absorb toxic gas, and NaOH is added as a neutralizing agent.

As described above, in the present invention, wastewater used for processing industrial wastes or wastewater used in the industrial waste processing step is stored and utilized as a water source to cool waste gas or to sprinkle over toxic gas to absorb it. The toxic-gas-absorbed water is burned in the incinerator, and part of which is used to cool the waste gas from the incinerator.

The present invention provides a method for drying industrial wastes in the dryer prior to incineration using heat generated in the incinerator to efficiently incinerate wastes, and a method in which leachate in the waste treatment plant can be completely utilized within the facility without discharging it into the outside environment. Therefore, the present invention make it possible to protect the environment from the contamination of leachate and to control leachate at a minimum cost.

The present invention will be understood more readily with reference to the following examples; however these examples are intended to illustrate the invention and are not to be construed to limit the scope of the invention.

EXAMPLE 1

Figure 1B:
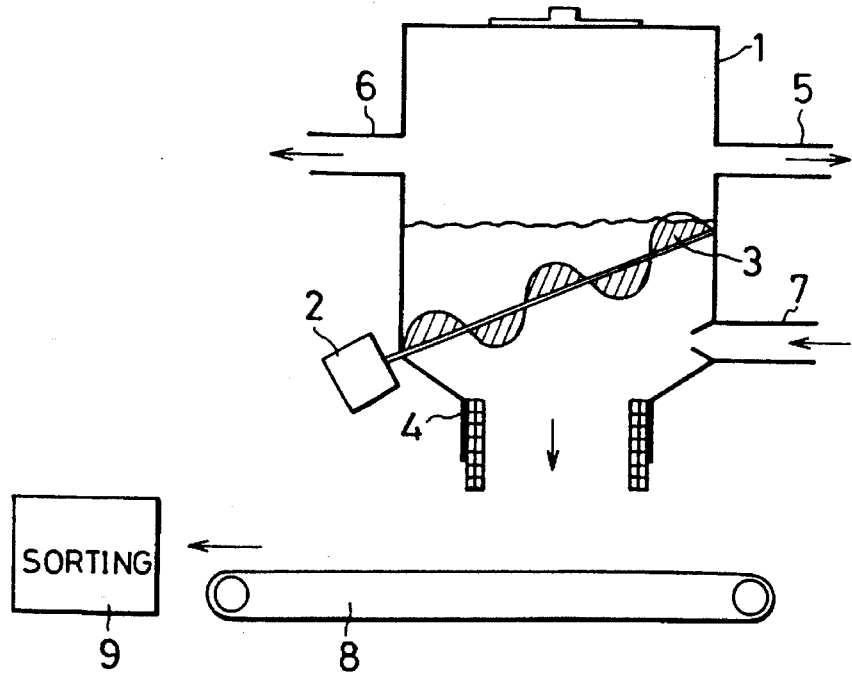

100 kg of Chinese cabbage (water content; about 95%) whose water content is believed to be equivalent to the garbage of the household was fed into the hopper-type dryer (capacity; 100 kg/operation) equipped with rotor 3 as is shown in FIG. 1, and was dried by the following conditions.

| | |
|---|---|
| Pressure (reduced) | 500–800 mmAq |
| Temperature | −20 ± 5° C. |
| Air | 10 m/sec. |
| Drying time | 40 min. ± 10 min. |
| Number of revolution of stirring rotor | 15 ± 5 rpm |

After drying, 60–70% water content of the Chinese cabbage was removed and was readily incinerated in the incinerator. The results are shown in FIGS. 2 and 3.

Figure 2:
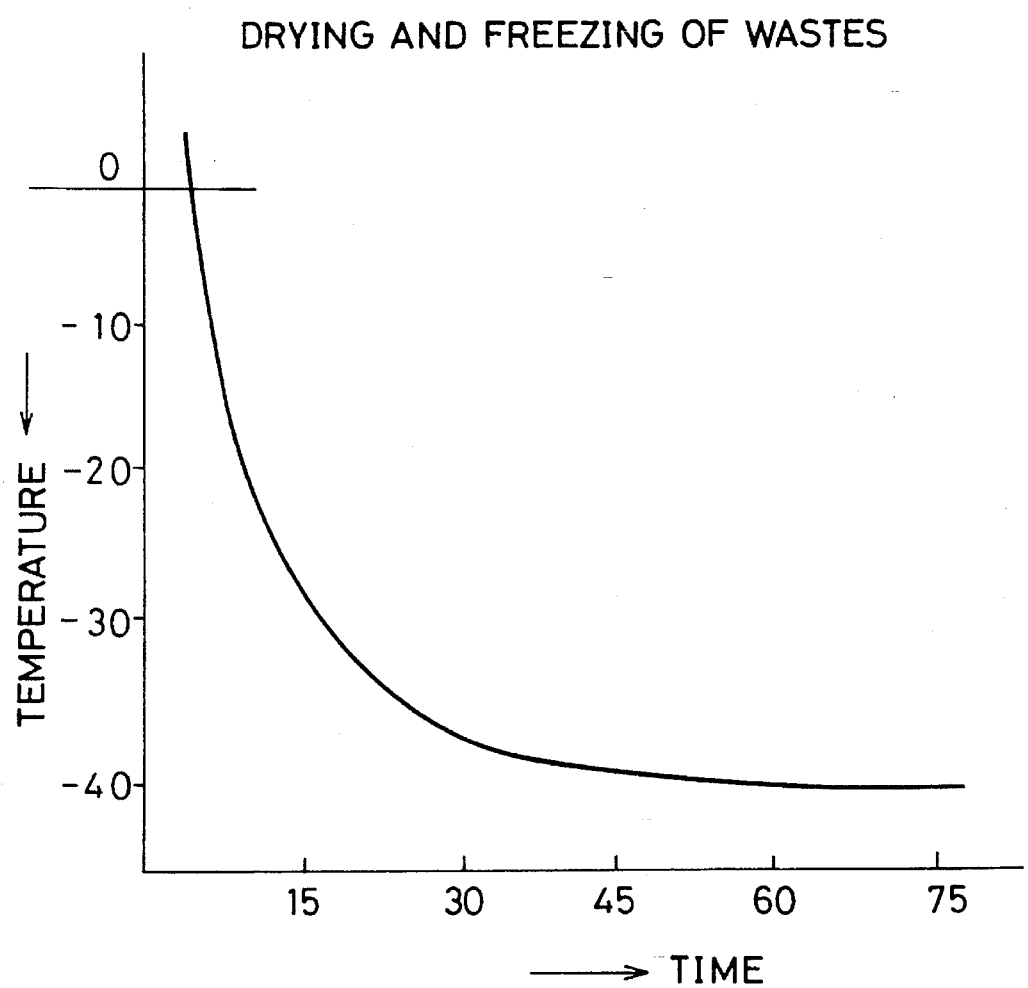
FIG. 2 is a graph demonstrating drying and freezing of wastes.
Figure 3:
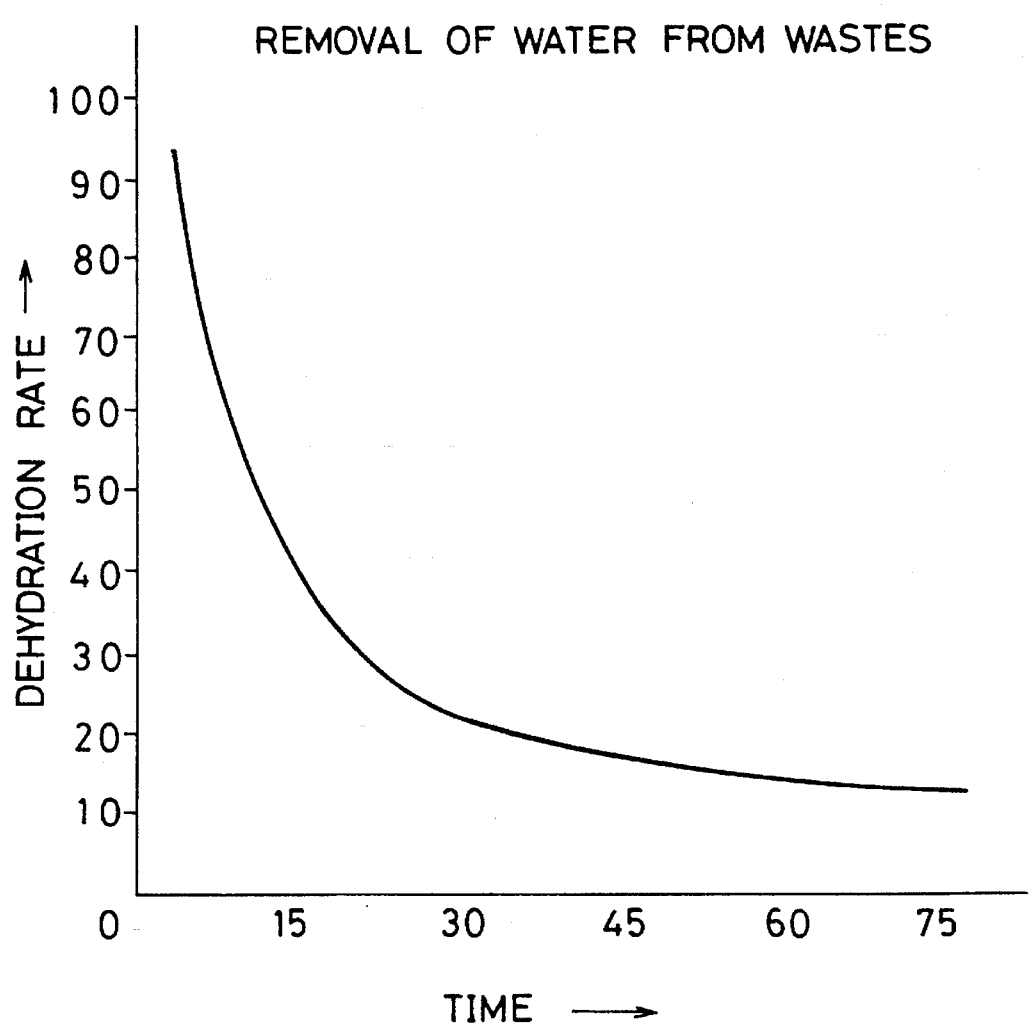
FIG. 3 is a graph demonstrating the removal of water from wastes.

As is evident from FIGS. 2 and 3, drying was achieved in 40–45 minutes. Thereafter, further drying had no effect on the dryness of the cabbage. Table 1 shows drying time and rate.

TABLE 1

| Time (min.) | 15' | 30' | 45' | 60' |
|---|---|---|---|---|
| Drying (once) | 40% | 56% | 77% | 79% |
| Drying (twice) | 35% | 60% | 74% | 76% |

After drying, bearer 4 at the bottom of the hopper opens on both sides (FIG. 1B) and the dried Chinese cabbage was sent to the sorter 9 by the removal conveyor 8. In the sorter, wastes instead of Chinese cabbage in a real situation are sorted into flammable or nonflammable substances.

EXAMPLE 2

100 kg of Chinese cabbage (water content; about 95%) was fed in the hopper-type dryer (capacity; 100 kg/operation) equipped with rotor 3 as is described in Example 1, and was dried by the same conditions as described above except that air blowing in was at 80° C.±10° C. The results are shown in Table 2.

TABLE 2

| Time (min.) | 15' | 30' | 45' | 60' | 75' |
|---|---|---|---|---|---|
| Drying rate | 70% | 83% | 88% | 91% | 94% |

After drying and sorting, vegetable refuse and weed refuse can be used as compost materials.

EXAMPLE 3

The waste treatment plant shown in FIG. 4 was operated for 24 hours continuously. The environmental pollution prevention condition of the plant is shown in Table 3.

TABLE 3

| | |
|---|---|
| Dust | 0.02 g/Nm$^3$ or below |
| NOx (O$_2$ = 12%) | 180 ppm or below |
| HCl (O$_2$ = 12%) | 100 ppm |
| SOx | K value = 7 or below |
| Amount of the volume reduction of ash by heat (600° C., 3 h) | 7% or below |

Figure 5:
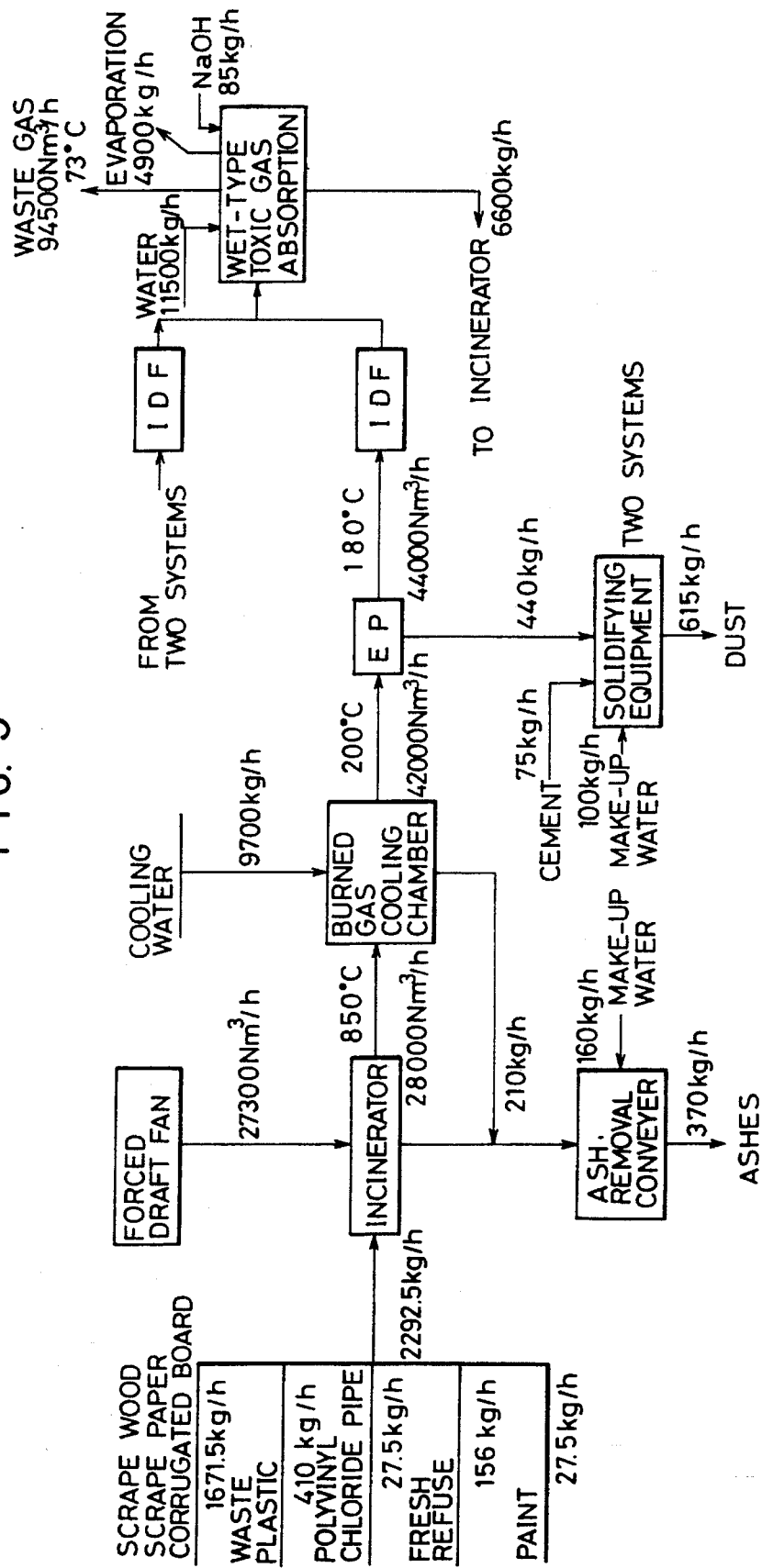
FIG. 5 illustrates a material balance of the present invention.

When the incinerator shown in FIG. 4 is operated at a capacity of 55 t/day, the material balance is shown in FIG. 5.

Refuse was fed to the incinerator at 2292.5 kg/h. The refuse includes scrap wood, scrap paper and corrugated board (1671.5 kg/h), waste plastic (410 kg/h), polyvinyl chloride pipe (27.5 kg/h), fresh refuse (156 kg/h), and paint (27.5 kg/h). Burned gas was produced at 28,000 Nm$^3$/h at 850° C. by using the air blow of the forced draft fan at 27,300 Nm$^3$/h. The waste gas was cooled by cooling water at 9,700 kg/h in the burned gas cooling chamber. Consequently, the waste gas was sent at 4,200 Nm$^3$/h at a reduced temperature of 200° C. and treated in the electric dust collector.

The waste gas treated in the electric dust collector was sent to the wet-type toxic gas absorption equipment at 44,000 Nm$^3$/h, at 180° C. by IDF.

Water (11,500 kg/h) and NaOH (85 kg/h) were added to the wet-type toxic gas absorption equipment to produce waste gas at 94,500 Nm$^3$/h and steam at 4,900 kg/h at 73°

C. The waste gas and stream were released into the atmosphere through the chimney. Part of the toxic-gas-absorbed water was incinerated at 6,600 kg/h and the remaining water was used to cool the waste gas from the incinerator.

Ashes in the incinerator and in the waste gas cooling chamber were removed at 210 kg/h. Water was added to the ash at 160 kg/h to give burned ashes at 370 kg/h.

The dust was produced at 440 kg/h in the electric dust collector of two systems. Cement and make-up water were added at 75 kg/h and 100 kg/h, respectively, to solidify the dust at 615 kg/h.

The present invention provides a method for completely eliminating the discharge of leachate to the local environment around the industrial waste treatment plant, comprising processing the burned ash and dust according to methods, for example, those described in Japanese Patent Application No. 96995/1991, and utilizing the leachate to cool or absorb the waste gas or toxic gas from the incinerator.

Electric power, cement and other conditions in the process described above are shown in Table 4.

TABLE 4

| | |
|---|---|
| Electric power rated output (normally from two systems) | about 750 kW |
| load factor | 65% |
| consumption | 750 kw × 0.65 × 24 h = 11,700 kWH/day |
| Water | about 30 m3/h × 24 h = 720 m3/day |
| cement | 100 kg/h × 24 h = 2,400 kg/day |
| Stabilizing burner (used initially) | 600 L/rev. |
| Operator | about 3 |

Figure 6:
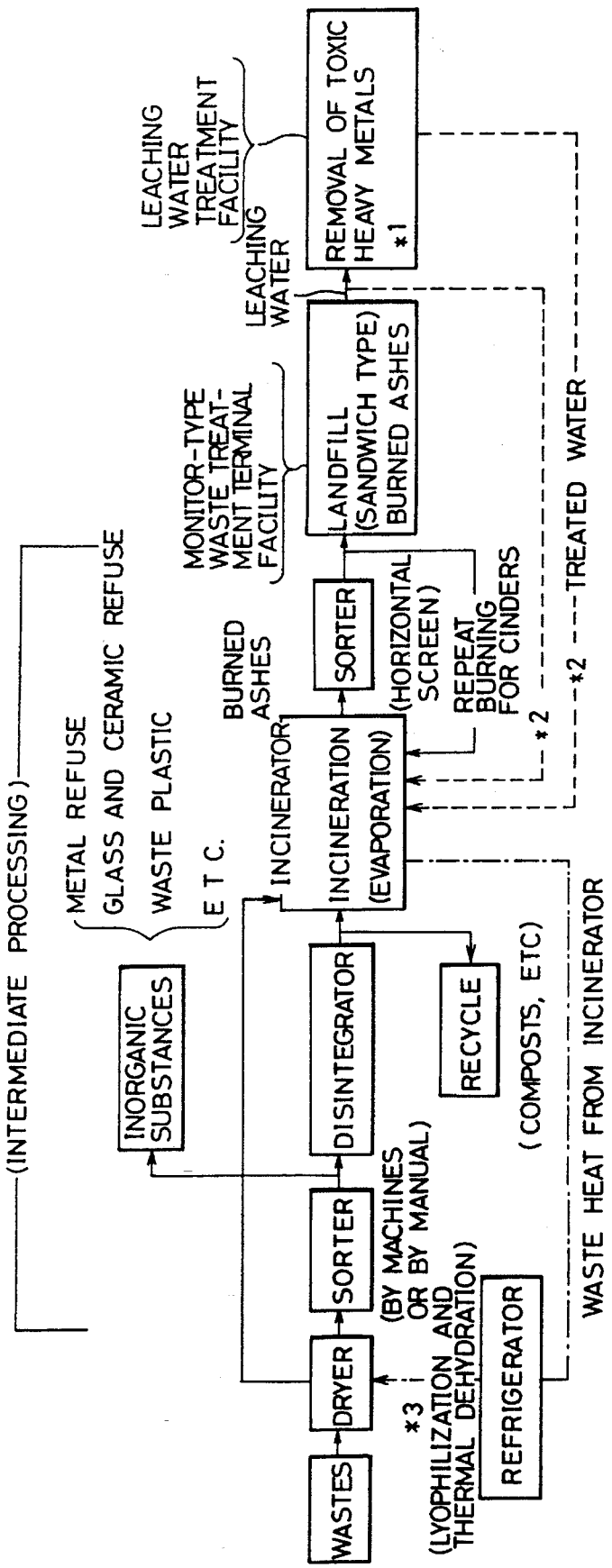
FIG. 6 is a flow chart showing the major steps to carry out the present invention.

FIG. 6 is a flow chart showing the process of FIG. 4.

As is evident from the flow chart of FIG. 6, wastes to be processed are subjected to drying and sorting as pretreatments, and sorted bulky wastes are shattered in the disintegrator.

In this process, wastes are dried with air heated by waste heat from the incinerator, or with air cooled through a heat-absorbing-type refrigerator using waste heat from the incinerator under reduced pressure of the dryer (heat is delivered as shown in arrow *3). After drying, the wastes are sorted into combustibles and incombustibles in a sorter. Bulky wastes from the sorted combustibles are shattered and successively fed in a predetermined amount into the incinerator. Among them, wastes utilizable as resources are specifically used as composts, etc. The shattered or dried and sorted combustibles are burned in the incinerator, and heat from the burned waste gas is used in the drying step directly or as cool air obtained through the heat-absorbing-type refrigerator.

Burned ashes from the incinerator are sorted and processed so as to meet each purpose. The burned ashes with toxic components occluded therein are recovered in a cullet-like form. The burned waste gas is cooled, and after floating dusts are collected therefrom with an electrostatic percipitator, the burned waste gas is released into the air via a wet-type toxic gas absorption equipment. The released waste hardly caused air pollution.

Wastewater used for processing wastes or wastewater generated in the processing step is stored and utilized as water for cooling said burned waste gas or as a water source for said toxic gas absorption (water is fed as indicated in arrow *2).

What is claimed is:

1. A method for processing leachate from industrial wastes, comprising pooling, in an equalizing tank, treated leachate from a general-purpose-harmful-component-removal equipment which prevents the discharge of toxic heavy metals contained in industrial wastes and their burned ashes, sending the treated leachate from the equalizing tank to a cooling-water receiving tank of waste gas from an incinerator, and sending a given amount of the treated leachate from the cooling-water receiving tank to a cooling site of the waste gas.

2. A method for processing leachate from industrial waste of claim 1 further comprising sending a given amount of treated leachate from the cooling-water receiving tank to a wet-type toxic gas absorption equipment.

3. A method for processing leachate according to claim 2 in which part of the leachate in the wet-type toxic gas absorption equipment is used to cool waste gas from an incinerator.

4. A method for processing leachate from industrial wastes, comprising pooling, in an equalizing tank, leachate containing toxic heavy metals contained in industrial wastes and their burned ashes without processing the leachate, sending the leachate from the equalizing tank to a cooling-water receiving tank for waste gas from an incinerator and sending a given amount of the leachate from the cooling-water receiving tank to a cooling site of the waste gas.

5. A method for processing leachate from industrial wastes according to claim 4 further comprising sending a given amount of leachate from the cooling-water receiving tank to a wet-type toxic gas absorption equipment.

6. A method for processing leachate according to claim 5 in which part of the leachate in the wet-type toxic gas absorption equipment is used to cool waste gas from an incinerator.

\* \* \* \* \*